US011111832B2

(12) United States Patent
Bahadur Thapa et al.

(10) Patent No.: US 11,111,832 B2
(45) Date of Patent: Sep. 7, 2021

(54) CONDITIONING OF THE EXHAUST GAS PLUME OF A MARINE VESSEL

(71) Applicant: Yara Marine Technologies AS, Oslo (NO)

(72) Inventors: Shyam Bahadur Thapa, Oslo (NO); Peter Strandberg, Oslo (NO); Per Hakan Bjaerkby, Pixbo (SE)

(73) Assignee: YARA MARINE TECHNOLOGIES AS, Oslo (NO)

( * ) Notice: Subject to any disclaimer, the term of this patent is extended or adjusted under 35 U.S.C. 154(b) by 60 days.

(21) Appl. No.: 16/497,847

(22) PCT Filed: May 24, 2018

(86) PCT No.: PCT/EP2018/063595
§ 371 (c)(1),
(2) Date: Sep. 26, 2019

(87) PCT Pub. No.: WO2018/215577
PCT Pub. Date: Nov. 29, 2018

(65) Prior Publication Data
US 2020/0102867 A1 Apr. 2, 2020

(30) Foreign Application Priority Data

May 24, 2017 (EP) .................................... 17172690

(51) Int. Cl.
| *F01N 3/05* | (2006.01) |
| *F01N 3/04* | (2006.01) |
| *F01N 3/30* | (2006.01) |

(52) U.S. Cl.
CPC ................ *F01N 3/05* (2013.01); *F01N 3/04* (2013.01); *F01N 3/306* (2013.01);
(Continued)

(58) Field of Classification Search
CPC ............. F01N 2260/06; F01N 2270/08; F01N 2590/02; F01N 3/04; F01N 3/05; F01N 3/306; F01N 3/323
See application file for complete search history.

(56) References Cited

U.S. PATENT DOCUMENTS

| 6,358,109 B1 * | 3/2002 | Neisen ...................... F01P 5/08 440/89 R |
| 9,149,768 B1 * | 10/2015 | Devarakonda .......... F01N 3/101 |

(Continued)

FOREIGN PATENT DOCUMENTS

DE 3225716 C1 6/1983

OTHER PUBLICATIONS

Chinese Office Action; Chinese Application No. 201880034115.9; dated Jan. 18, 2021; 8 pages.

*Primary Examiner* — Anthony Ayala Delgado
(74) *Attorney, Agent, or Firm* — Dilworth IP, LLC

(57) ABSTRACT

An arrangement for a marine vessel, comprising a combustion unit arranged in an engine room of the marine vessel, an exhaust gas cleaning system in flow connection with the combustion unit and being arranged for receiving and for cleaning the exhaust gas from the combustion unit to a cleaned exhaust gas, a cleaned gas exhaust pipe being in flow connection with the exhaust gas cleaning system and arranged for receiving the cleaned exhaust gas, a plume control system, comprising an air intake for taking in ambient air, a heater for heating the ambient air producing heated air, and a gas mixer placed in the cleaned gas exhaust pipe and arranged for mixing the cleaned exhaust gas in the cleaned gas exhaust pipe with the heated air resulting in an exhaust gas mixture that is blown out into the atmosphere via the one or more exhaust gas outlets.

16 Claims, 3 Drawing Sheets

(52) U.S. Cl.
CPC ...... *F01N 2260/06* (2013.01); *F01N 2270/08* (2013.01); *F01N 2590/02* (2013.01)

(56) References Cited

U.S. PATENT DOCUMENTS

| | | | |
|---|---|---|---|
| 2006/0179824 A1* | 8/2006 | Roser | F01N 13/009 60/289 |
| 2011/0283676 A1* | 11/2011 | Reichelderfer | F01N 9/00 60/274 |
| 2016/0376957 A1* | 12/2016 | Kulkarni | F01D 25/305 60/39.5 |
| 2017/0182442 A1* | 6/2017 | Kippel | B01D 53/8625 |
| 2017/0204771 A1* | 7/2017 | Zhang | F01N 3/2892 |

* cited by examiner

CONDITIONING OF THE EXHAUST GAS PLUME OF A MARINE VESSEL

TECHNICAL FIELD

The present application relates to the control of the final discharge of exhaust gas from a combustion unit arranged in an engine room of a marine vessel and being cleaned by an exhaust gas cleaning system into the atmosphere by conditioning of the exhaust gas plume.

BACKGROUND

Marine vessels conventionally are provided with one or more combustion units such as diesel engines, oil-fired boilers, incinerators, etc. The combustion units usually have independent exhaust gas duct assemblies, in which the cleaning of exhaust gases takes place separately in each combustion unit. Gases originating from oil-fired boilers are commonly referred to as 'flue gases', while gases from diesel engines are commonly referred to as 'exhaust gases'. In this patent application, the general term 'exhaust gas' will be used for gases from all relevant types of combustion units.

Temperature is a key parameter in determining the mass of water a given quantity of exhaust gas can contain within the exhaust gas pipe, i.e. the higher the temperature, the greater the mass of water that can be held before saturation is reached. Between the engine and an exhaust gas cleaning (EGC) unit (for instance a scrubber), the exhaust temperature can be approximately 300° C., but after passage through the EGC unit, the temperature is reduced very significantly—perhaps by 85%. When the low temperature saturated exhaust gases leave the scrubber and are introduced to the atmospheric air, the exhaust gases typically have a high relative humidity through which the humidity condenses and forms a visible white plume (white smoke) in the vicinity of and outside the exhaust stack. In addition to high relative humidity, the exhaust gases are rather cold thus lacking the normal buoyance of hot exhaust gases. Consequently, there is a great risk that the plume or a part of it, i.e. the cold and humid exhaust gases, descends and grounds on the marine vessel in question, on other vessels, port facilities or other adjacent areas.

At present, there already exist arrangements for a marine vessel in which the cold and scrubbed exhaust gases are reheated to avoid the formation of white smoke and to raise the buoyancy of the exhaust gases discharged at the atmosphere so that they do not descend or ground and also lessens undesired condensation in connection with the scrubber unit.

In WO 2009/022050 for instance, a machinery arrangement of a marine vessel is disclosed comprising an internal combustion engine, a heat recovery device for recovering waste heat from the exhaust gas of the internal combustion engine, a scrubber unit and a separate heating system for producing heat for hotel consumers on board of the marine vessel. In operation, the exhaust gas from the internal combustion engine is led to the heat recovery device and further to the scrubber unit. Primary feed water is supplied to the separated heating system and led further to the heat recovery device as circulating water, where it partially evaporates as a result of the heat generated by the exhaust gas and is returned as a mixture of water and steam to a steam drum of the heating system. Steam may then be delivered from the steam drum for consumption on board. Excess heat with respect to the steam delivered for consumption that is generated by the heat recovery device and led through the steam drum is led to and circulated through a reheating device (30) arranged at the exhaust gas outflow end of the scrubber unit (3) (see lines 55 and 56). This steam flow is used to reheat the exhaust gas flow in the scrubber unit (3) in order to raise the temperature of the scrubbed exhaust gas discharged in the atmosphere (flow line 31).

The disadvantage of this arrangement is however that when exhaust gas is mixed with steam, condensation can take place outside the marine vessel which can descend or ground.

In WO 2009/125050, a machinery arrangement is described comprising
  a combustion unit arranged in an engine room; and
  an exhaust gas duct assembly connected to the combustion unit for receiving an exhaust gas flow and for leading the exhaust gas flow to the atmosphere through an exhaust gas cleaning system provided with an exhaust gas pipe being arranged in an enclosure that is arranged in flow connection with the engine room in order to provide heat for the exhaust gas pipe by means of a heated air flow from the engine room.

In operation, a heated air flow is provided by ventilation air from the engine room through a ventilation outlet into the enclosure. The heated air flow flowing through the enclosure towards the jacket portion heats the exhaust gas pipe of the scrubber unit. The heated air flow is thus led into contact with and mixed with the wet exhaust gas from the exhaust gas pipe which is discharged into the atmosphere.

The disadvantage of this arrangement however is that the exhaust gas air produced by the combustion engine has a temperature of approximately 45° C., or even lower which can be the case if the marine vessel is operating in very cold places. This will only assist minorly to heat the temperature of the exhaust gas coming out of the scrubber, but this will not be sufficient to take care exhaust gas blown out of a chimney does not descends and grounds.

It is consequently a purpose of the invention to avoid that cleaned exhaust gas coming from a combustion unit in an engine room of a marine vessel, that is passed via an exhaust gas cleaning system to an exhaust gas pipe and to one or more cleaned exhaust gas pipe outlets blowing out the cleaned exhaust gas into the atmosphere, descends and grounds on the marine vessel and/or other adjacent areas.

SUMMARY

According to a first aspect of the present application, an arrangement for a marine vessel is provided, comprising
  a combustion unit arranged in an engine room of the marine vessel;
  an exhaust gas cleaning system in flow connection with the combustion unit and being arranged for receiving and for cleaning the exhaust gas from the combustion unit resulting in a cleaned exhaust gas;
  a cleaned gas exhaust pipe being in flow connection with the exhaust gas cleaning system and arranged for receiving the cleaned exhaust gas;
  a plume control system, comprising
    an air intake for taking in ambient air;
    a heater for heating the ambient air producing heated air; and
    a gas mixer placed in the cleaned gas exhaust pipe and arranged for mixing the cleaned exhaust gas in the cleaned gas exhaust pipe with the heated air resulting in an exhaust gas mixture that is blown out into the atmosphere via one or more cleaned gas exhaust pipe outlets.

In a particular embodiment, the exhaust gas cleaning system comprises a scrubber. The scrubber is preferably configured for reducing $SO_x$ present in the exhaust gas produced by the combustion unit. The scrubber is preferably positioned vertically within the exhaust gas cleaning system.

In a particular embodiment, the arrangement as described herein comprises a casing. The casing of a marine vessel is the structure that covers the upper parts of the engine room and is provided with the outlets of the cleaned gas exhaust pipe outlets. The casing is in most cases are open to ambient air. In a particular embodiment of the arrangement as described herein, the air intake takes in ambient air from the casing.

The air intake as described herein typically takes in ambient air from the surrounding area. A skilled person would understand that ambient air is considered as atmospheric air in its natural state. Ambient air is typically 78% nitrogen and 21% oxygen. The composition of ambient air varies depending on the elevation above sea level as well as human factors such as the level of pollution. Care should be taken that the ambient air is not contaminated with exhaust gas or cleaned exhaust gas as this would unnecessarily contaminate the heater, resulting in potential unwanted effects.

By mixing heated air with the colder cleaned exhaust gas coming out of the exhaust gas cleaning system through the cleaned gas exhaust pipe, the temperature of the cleaned exhaust gas will increase through which the cleaned exhaust gas will expand. The additional volume of the expanded exhaust gas mixture will increase the velocity thereof through which the exhaust gas mixture will be blown higher up in the atmosphere above the marine vessel out of the one or more cleaned gas exhaust pipe outlets, preventing the blown out exhaust gas mixture from falling down on the marine vessel and/or other adjacent areas. This arrangement further reduces the visibility of the exhaust gas plume coming out of the one or more cleaned gas exhaust pipe outlets.

According to one embodiment of a system according to the application, the cleaned gas exhaust pipe has a substantial constant diameter in order optimize the effect. While an increase in the diameter typically at least partially reduces the effect, a substantial constant diameter or a reduction of the diameter provide an improved blow out of the exhaust gas mixture.

According to one embodiment of an arrangement according to the application, the plume control system comprises a fan arrangement placed before the heater and arranged for blowing the air into the heater and for blowing the heated air towards the gas mixer.

In an embodiment of an arrangement according to the application, a flexible connection is placed after the fan arrangement to reduce the fan vibrations.

In an embodiment of an arrangement according to the application, the plume control system comprises a silencer placed between the air intake and the fan arrangement in order to dampen the noise of the air taken in via the air intake.

In a possible embodiment of an arrangement according to the application, the heated air has a temperature of between 70° C. and 80° C.

In an embodiment of an arrangement according to the application, the plume control system comprises a valve that is arranged to be closed to bypass the exhaust gas cleaning system in case it is not in use.

In a possible embodiment of an arrangement according to the application, the plume control system comprises a throttle valve placed in the cleaned gas exhaust pipe between the demister and the gas mixer, wherein the throttle valve has a diameter that is smaller than the diameter of the cleaned gas exhaust pipe. This throttle will not completely close of the cleaned gas exhaust pipe and work as a throttle for the exhaust gas flow through the cleaned gas exhaust pipe controlling the under pressure in the downstream exhaust gas treatment system. This throttle valve will furthermore take care that the demister doesn't let scrubber liquids through.

In a possible embodiment of an arrangement according to the application, the heater is a steam heater using steam to heat the air taken in via the air intake, and the plume control system further comprises a steam inlet for letting in steam.

In an embodiment of an arrangement according to the application, the plume control system comprises a temperature sensor to measure the temperature of the heated air, which temperature sensor is placed after the steam heater, and a steam flow regulating valve for regulating the flow of the steam through the steam heater based on the measurement of the temperature by the temperature sensor.

In a particular embodiment of an arrangement according to the application, the plume control system comprises a first steam trap which is installed between the steam inlet and the steam flow regulating valve. This avoids that condensed steam is flowing into the steam flow regulating valve.

In an embodiment of an arrangement according to the application, the plume control system comprises a second steam trap placed after the steam heater. This second steam trap makes sure that only condensate can leave the steam heater.

In a possible embodiment of an arrangement according to the application, the plume control system comprises a vacuum safety valve and an air vent situated between the steam flow regulating valve and the steam heater.

In an embodiment of an arrangement according to the application, the plume control system comprises a ball valve in the vicinity of the steam inlet which is closed during normal operation and which is arranged to be opened during start up or on demand. This ball valve cleans the steam circuit from dirt during start up or whenever it is necessary.

In case there is not enough steam on board of the marine vessel, in a possible embodiment of an arrangement according to the application, the heater is an electric heater.

In an embodiment of an arrangement according to the application, the plume control system comprises a temperature sensor to measure the temperature of the heated air, the temperature sensor being placed after the electric heater, and the electric heater comprises a plurality of heating rods, the number thereof based on the temperature measured by the temperature sensor.

According to a second aspect of the present application, a plume control system for an arrangement according to the application as described above is disclosed.

According to a third aspect of the present application, a marine vessel provided with an arrangement according to the application as described above is disclosed.

According to a fourth aspect of the present application, a method is disclosed for avoiding that cleaned exhaust gas from a marine vessel descends and grounds on the marine vessel and/or other adjacent areas, comprising the steps of
  taking in ambient air via an air intake;
  bringing the ambient air from the air intake to a heater, preferably an electric heater or a steam heater, thereby creating heated air;
  bringing the heated air to a gas mixer arranged in the cleaned gas exhaust pipe;

mixing cleaned exhaust gas with the heated air in the gas mixer resulting in a cleaned exhaust gas mixture;

blowing the cleaned exhaust gas mixture out into the atmosphere via the one or more cleaned gas exhaust pipe outlets.

In a possible method according to the application, the method comprises the step of heating the air to a temperature of between 70° C. and 80° C.

In an optional method according to the application, the step of bringing the air from the air intake to a heater thereby creating heated air is more in particular done by blowing the air to the heater by means of a fan arrangement.

In a possible method according to the application, the step of bringing the heated air to the gas mixer arranged in the exhaust pipe is more in particular done by blowing the heated air to the gas mixer by means of the fan arrangement.

In a possible method according to the application, the step of bringing the air to a heater thereby creating heated air comprises the steps of introducing steam via a steam inlet into a steam heater; and bringing the air from the air intake to the steam heater thereby creating heated air.

In another possible method according to the application, when there is not sufficient steam available on board of the marine vessel, the step of bringing the air to a heater thereby creating heated air comprises the step of brining the air to an electric heater thereby creating heated air.

In a possible method according to the application, an arrangement according to the application as described above is used.

DETAILED DESCRIPTION

Figure 1:
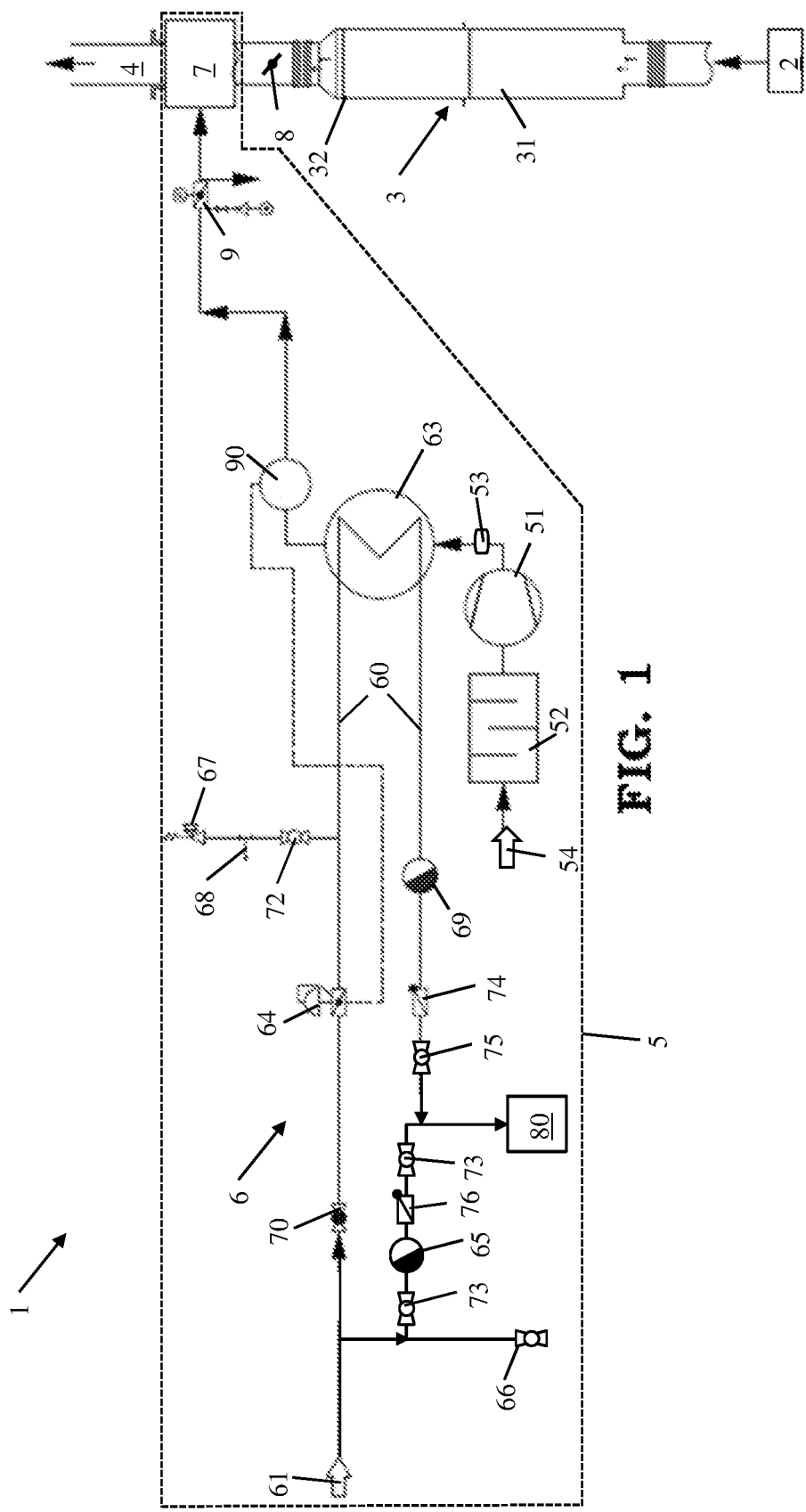
FIG. 1 shows an embodiment of an arrangement according to the application using a steam heater.

An arrangement (1) for a marine vessel according to the application, of which an embodiment using steam is shown in FIG. 1, comprises a combustion unit (2) that is arranged in an engine room, an exhaust gas cleaning system (3) that is in flow connection with the combustion unit (2) and that is arranged for receiving and for cleaning the exhaust gas from the combustion unit resulting in a cleaned exhaust gas, an cleaned gas exhaust pipe (4) that is in flow connection with the exhaust gas cleaning system (3) and arranged for receiving the cleaned exhaust gas. The cleaned gas exhaust pipe (4) optionally has a substantially constant diameter. The cleaned exhaust gas leaving the exhaust gas cleaning system (3) has a temperature of about 25° C. The combustion unit is a marine combustion unit typically not found in other transportation systems, such as cars, trucks, planes, trains, and the like. For instance, the marine combustion unit may be configured for operating on high sulphur fuel oil, which is typically unsuitable for other transportation systems.

In an embodiment, the exhaust gas cleaning system (3) comprises a scrubber (31). The scrubber (31) provides a reduction of toxic gas emissions, in particular of SOx (Sulphur Oxides), which are typically produced by the combustion unit of marine vessels, especially when operating on high sulphur fuel oil. The scrubber (31) works by passing a dirty exhaust gas stream through one or more chambers that are configured to capture errant particles present in the gas stream. The further details of scrubber technology (e.g. different modes or loops; open, closed and hybrid systems) may be considered known in the art. The scrubber is a marine vessel scrubber typically not found in other transportation systems, such as cars, trucks, planes, trains, and the like.

In some embodiments the scrubber is positioned vertically within the exhaust gas cleaning system (3). The vertical direction is determined respective to the flow of the exhaust gas; in other words when the scrubber is positioned vertically the gas flows upwards and/or downwards throughout the scrubber (31). Optionally, the gas flows upwards throughout the scrubber (31) to allow for improved scrubbing efficiency. The gas enters the scrubber through an entry point and exits the scrubber through an exit point, wherein the exit point is preferably axially remote from the entry point. When the exhaust gas is guided to flow upwards, the scrubber exit point is situated higher than the scrubber entry point; and vice versa for a downwards guided flow. The entry and exit points optionally have a similar diameter. The exhaust gas leaving the scrubber may have a temperature of about 25° C.

The arrangement (1) further comprises a plume control system (5) that is arranged to increase the flow velocity of the cleaned exhaust gas in the cleaned gas exhaust pipe (4) such that the cleaned exhaust gas is blown higher up above the marine vessel out of one or more exhaust gas outlets that are optionally arranged in a casing (not shown on the FIGS.). The one or more exhaust gas outlets are in flow connection with the cleaned gas exhaust pipe (4). Optionally, the exhaust gas outlets is positioned to guide the flow of the cleaned exhaust gas in a vertical direction, preferably an upwards direction, throughout the gas outlet. Optionally, the cleaned exhaust gas enters the exhaust gas outlet through an entry point, flows vertically and exits through an exit point that is axially remote from the entry point. When the cleaned exhaust gas is guided to flow upwards, the exhaust gas outlet exit point is located higher than the exhaust gas outlet entry point. This plume control system (5) prevents that the expelled exhaust gas descends and grounds on the marine vessel such as the deck and/or adjacent areas such as other vessels and port facilities.

Figure 2:
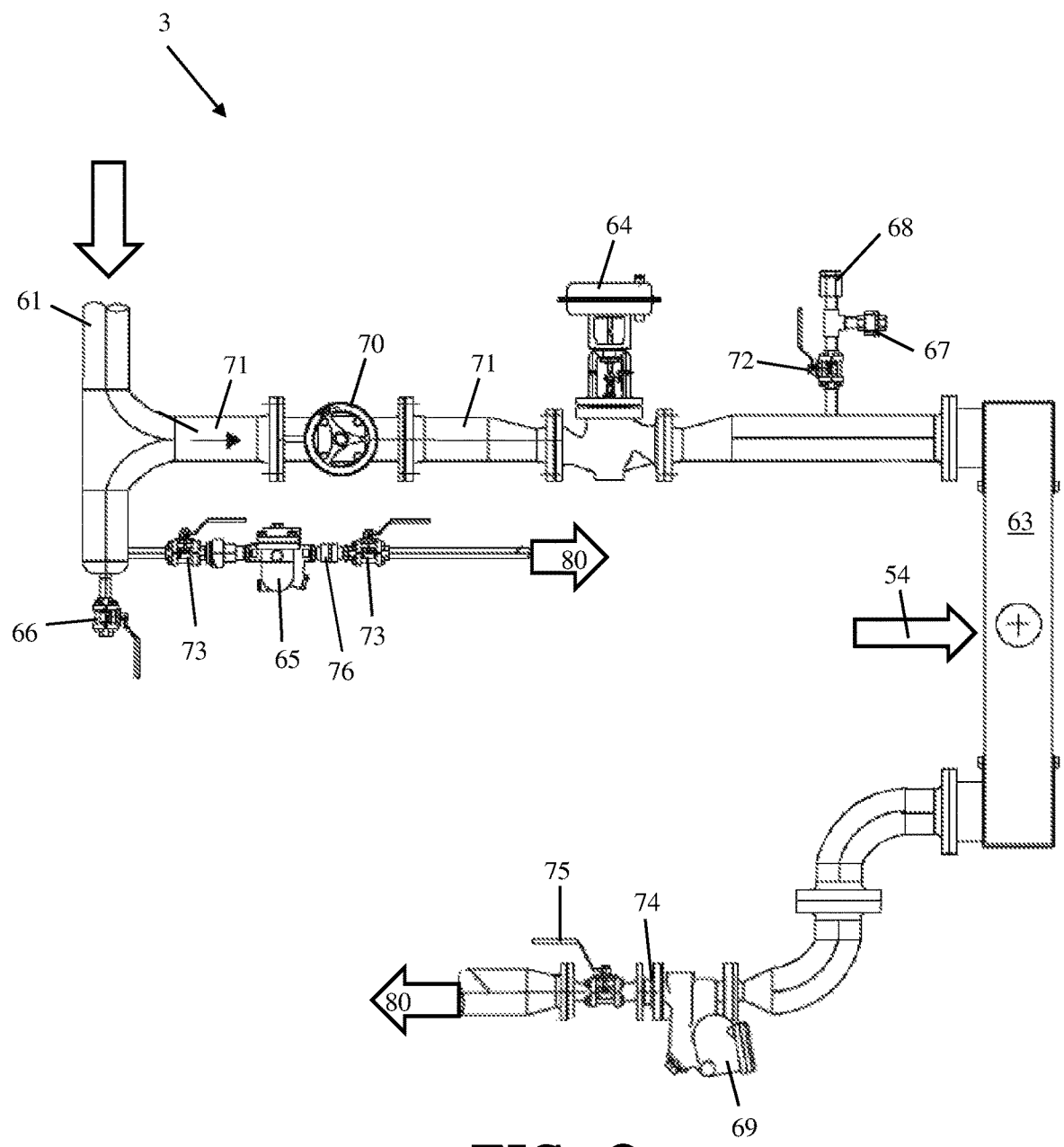
FIG. 2 shows an embodiment of a steam circuit forming part of an arrangement as shown in FIG. 1.

The plume control system (5) as shown in FIG. 1 comprises a steam circuit (6), of which an embodiment is shown in more detail in FIG. 2, for producing steam that is used to heat ambient air taken in from via an air intake (70), optionally from the casing of the marine vessel, resulting in heated air. Furthermore, a gas mixer (7) is placed in the cleaned gas exhaust pipe (4) and is arranged for mixing the cleaned exhaust gas coming out of the exhaust gas cleaning system (3) with the heated air resulting in an exhaust gas mixture. In an embodiment, the heated air has a temperature of between 70° and 80° C.

In the embodiment of the arrangement according to the application as shown in FIG. 1, the exhaust gas cleaning system (3) comprises a scrubber (31) for reducing $SO_x$ present in the exhaust gas produced by the combustion unit (2). It is noted that the scrubber is commonly known in the art and will consequently not be discussed here in more detail. The scrubber (31) comprises a demister (32) that is arranged to remove excess scrubber liquid from the cleaned exhaust gas. Between the demister (32) and the gas mixer (7), a throttle valve (8) is provided to prevent that the demister (32) would let scrubber liquid droplets through which could occur because of the increased velocity when the cleaned exhaust gas is mixed with the heated air. This throttle valve (8) more in particular has a diameter that is smaller than the diameter of the cleaned gas exhaust pipe (4) through which the cleaned gas exhaust pipe (4) will not completely be closed off and the throttle valve (8) will work as a throttle of the exhaust gas flow through the cleaned gas exhaust pipe (4).

Furthermore, a valve (9) is provided that is arranged to be open in case the marine vessel is running in scrubber mode and that is arranged to be closed in case the marine vessel is running in dry mode. In that case, the exhaust gas cleaning system (3) is bypassed. In the latter case, the throttle valve (8) will be in an open position such that the pressure drop caused by the scrubber (31) is kept to a minimum.

Figure 3:
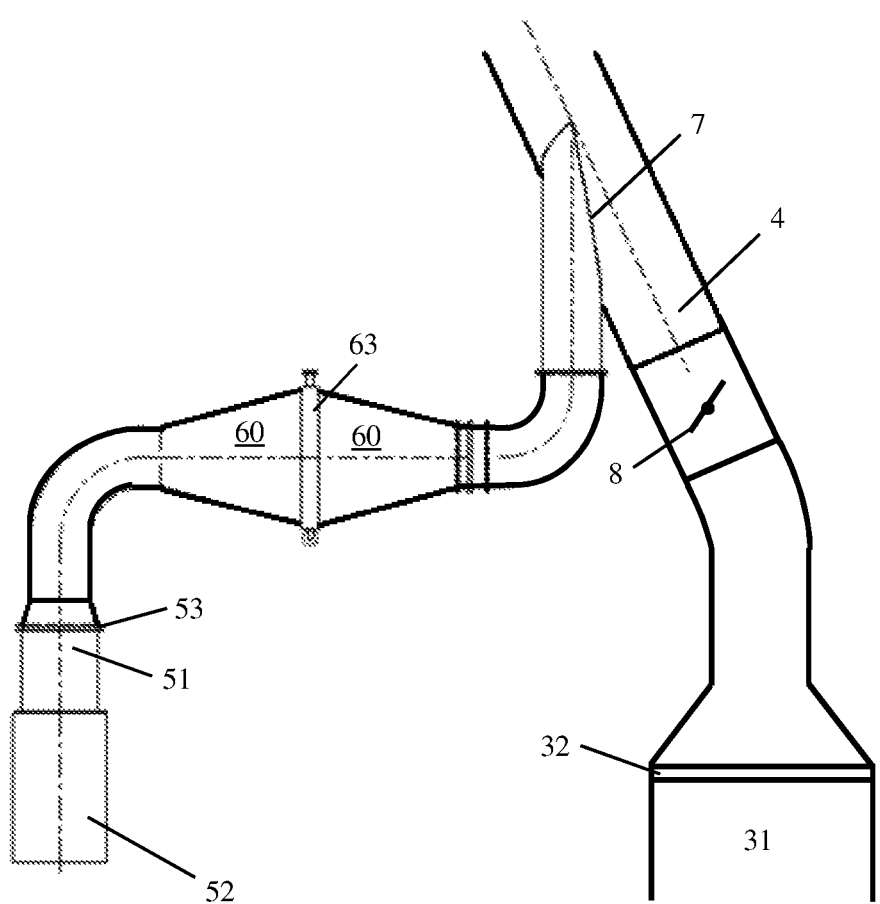
FIG. 3 shows an embodiment of a plume control system forming part of an arrangement as shown in FIG. 1.

In an embodiment of a steam circuit as shown in FIG. 2, the steam circuit (6) comprises a steam inlet (61) for taking in steam produced on board of the marine vessel. The steam flows from the steam inlet (61) to a steam heater (63) which is arranged to heat the ambient air from the air intake (70) by means of the steam taking in via the steam inlet (61). The steam inlet (61) is connected to the steam heater (63) via a steam duct (60) that continues after the steam heater (63). In an embodiment, the steam heater (63) comprises one or more heat exchangers to heat the ambient air by means of the steam. As can be seen in FIG. 3, in an embodiment, the steam duct (60) before and after the steam heater (63) has a form that widens towards the steam heater (63) to have an increased surface area resulting in a better heat exchange. After the steam heater (63), a temperature sensor (90) is provided that is arranged to measure the temperature of the heated air. The flow of the steam form the steam inlet (61) towards the steam heater (63) is regulated on the basis of the temperature of the heated air by means of a regulator valve (64). The regulator valves (64) furthermore set the operating pressure of the steam. In an embodiment, the steam has an operating pressure of about 7 bar. To avoid that steam would flow into the regulator valve (64), a first steam trap (65) is provided on the steam inlet (61).

Between the steam inlet (61) and the regulator valve (64), a cone valve (70) is provided arranged to be opened and closed to regulate the flow of the steam in the line (71) between the steam inlet (61) and the regulator valve (64) since there is always steam present in the main line (not shown on the FIGS.) of the marine vessel that is in connection with line (71).

To prevent that vacuum is created after the supply of steam to the steam heater is closed, and thus to prevent overpressure, after the regulator valve (64), a vacuum safety valve (67), an air vent (68) and a ball valve (72) are arranged to ensure proper drainage of the one or more heat exchangers in the steam heater (63) after vacuum is formed. The ball valve (72) is placed before the vacuum safety valve (67), which is normally open during operation, and is arranged to open the vacuum safety valve (67).

After the steam heater (63), a second steam trap (69) is provided to make sure that only condensate can leave the steam heater (63) allowing only condensate to pass through it. The condensate from both steam traps (65, 69) can be led back to one or more condensation tanks (80). More in particular, a joint condensation tank (80) is used to collect the condensate from the steam traps (65, 69). The steam traps (65, 69) are designed to give a quick and reliable response to varied steam consumption.

Before and after the first steam trap (65), a ball valve (73) is provided that is normally open during operation and that can be closed to isolate the steam circuit (6) from the respective condensation tank (80). After the first steam trap (65), a check valve (76) is provided to avoid that water would flow from the respective condensation tank (80) to the steam circuit (6). Also before the second steam trap (69), a check valve (74) is provided to avoid that water would flow towards the steam heater (63). Before the check valve (74), a ball valve (75) is provided that is normally open during operation and that can be closed to isolate the steam heater (63) from the respective condensation tank (80).

At the steam inlet (61), a ball valve (66) is installed which is normally in a closed state. During start up, or whenever it is necessary, the ball valve (66) is opened to clean the steam circuit (6) from dirt.

As can be seen in FIG. 3, the plume control system (5) further comprises a fan arrangement (51), more in particular comprising one or more axial fans, to blow the ambient air from the air intake to the steam heater (63) and to blow the heated air subsequently towards the gas mixer (7). Before the fan (51), a silencer (52) is placed. A silencer is used to reduce the noise level in the exhaust gas manifold. After the fan arrangement (51), a flexible connection (53) or flange is provided to compensate for the vibration of the fan arrangement (51).

If there is not a sufficient amount of steam on board of the marine vessel, the air taken in via the air intake (70), optionally from the casing, can also be heated by means of an electric heater (not shown in the FIGS.). The electric heater more in particular is provided with a number of heater rods. When an electric heater is used, no steam traps and condensation tank will be present. The rest of the components and the working principle as demonstrated in FIG. 1 is equal. In FIG. 3, the steam heater is then replaced by an electric heater.

The method according to the application for avoiding that exhaust gas, that is created in a combustion unit in an engine room (2) of a marine vessel and that is cleaned in an exhaust gas cleaning system (3) that is in flow connection with an cleaned gas exhaust pipe (4), optionally having a substantially constant diameter, which is in its turn in flow connection with one or more exhaust gas outlets that are blowing out the cleaned exhaust gas into the atmosphere, optionally arranged in a casing, descends and grounds on the marine vessel and/or other adjacent areas, comprises the steps of:
   taking in ambient air via an air intake (70);
   bringing the ambient air to a heater thereby creating heated air;
   bringing the heated air to a gas mixer (7) arranged in the cleaned gas exhaust pipe (4);
   mixing the cleaned exhaust gas with the heated air in the gas mixer (7) resulting in mixed gas;
   blowing the mixed gas out into the atmosphere via the one or more exhaust gas outlets.

In an embodiment, the exhaust gas cleaning system (3) comprises a scrubber. Optionally, the scrubber is configured for reducing $SO_x$ present in the exhaust gas produced by the combustion unit. The scrubber exhaust is thereby diluted with the heated air from the heater.

The ambient air from the air intake (70) is more in particular blown towards the steam heater (63) by means of a fan arrangement (51). The heated air is then subsequently blown towards the gas mixer (7) using the fan arrangement (51).

In an embodiment, the outside ambient air is heated by the heater (63) to a temperature of between 70° C. and 80° C. In case a steam heater (63) is used to heat the air form the air intake (70), the method comprises the step of bringing in steam in the steam inlet (61) and bringing this steam to the steam heater (63) to heat the air from the air inlet (70)

producing heated air. Optionally, the temperature of the steam is about 170° C. at a pressure of about 8 bar. Optionally, the relative weight ratio between the steam/air/exhaust gas in the mixed gas is 1:27:81, respectively.

In an embodiment, the temperature of the mixed gas, i.e. after mixing of the cleaned exhaust and the heated air, is approximately 20° C. higher than the temperature of the cleaned exhaust gas.

When there is not enough steam on board of the marine vessel, the air from the air intake (70) that needs to be heated to heated air can be brought to an electric heater to be heated there.

We claim:

1. An arrangement for a marine vessel, comprising:
   a combustion unit arranged in an engine room of the marine vessel;
   an exhaust gas cleaning system comprising a scrubber, the exhaust gas cleaning system being in flow connection with the combustion unit and being arranged for receiving and for cleaning the exhaust gas from the combustion unit resulting in a cleaned exhaust gas;
   a cleaned gas exhaust pipe being in flow connection with the exhaust gas cleaning system and arranged for receiving the cleaned exhaust gas;
   a plume control system, comprising:
      an air intake for taking in ambient air;
      a heater for heating the ambient air, producing heated air; and
      a gas mixer placed in the cleaned gas exhaust pipe and arranged for mixing the cleaned exhaust gas in the cleaned gas exhaust pipe with the heated air, resulting in an exhaust gas mixture that is blown out into the atmosphere via one or more cleaned gas exhaust pipe outlets,
   wherein the plume control system comprises a fan arrangement placed upstream the heater and arranged for blowing the ambient air into the heater and for blowing the heated air further towards the gas mixer and,
   wherein the plume control system comprises:
      a flexible connection placed after the fan arrangement to reduce the fan vibrations;
      a silencer placed between the air intake and the fan arrangement;
      a valve arranged to be closed to bypass the exhaust gas cleaning system in case it is not in use; and/or;
      a throttle valve placed in the cleaned gas exhaust pipe between a demister and the gas mixer, the throttle valve having a diameter that is smaller than the diameter of the cleaned gas exhaust pipe.

2. The arrangement according to claim 1, wherein the heated air has a temperature of between 70° C. and 80° C.

3. The arrangement according to claim 1, wherein the heater is an electric heater or a steam heater using steam to heat the air taken in via the air intake, wherein if the heater is a steam heater, the plume control system further comprises a steam inlet for letting in steam.

4. A marine vessel provided with the arrangement according to claim 1.

5. The arrangement according to claim 1 wherein the scrubber is vertically positioned.

6. A method for avoiding cleaned exhaust gas from a marine vessel descending and grounding on the marine vessel and/or other adjacent areas, the method comprising the steps of:
   taking in ambient air via the air intake;
   bringing ambient air to the heater, thereby creating heated air;
   bringing the heated air to the gas mixer arranged in a cleaned gas exhaust pipe;
   mixing cleaned exhaust gas with the heated air in the gas mixer resulting in a cleaned exhaust gas mixture;
   blowing the cleaned exhaust gas mixture out into the atmosphere via the one or more cleaned gas exhaust pipe outlets,
wherein the method uses the arrangement according to claim 1.

7. The method according to claim 6, wherein the step of bringing the air from the air intake to a heater thereby creating heated air comprises the steps of:
   introducing steam via a steam inlet into a steam heater; and
   bringing the air from the air intake to the steam heater, thereby creating heated air.

8. The method of claim 6 where the heater is an electric heater or a steam heater.

9. The method of claim 6 where the heated air is from 70° C. to 80° C.

10. The method of claim 6 where the heated air is blown to the gas mixer by means of the fan arrangement.

11. The arrangement according to claim 3, wherein the plume control system-comprises:
   a temperature sensor to measure the temperature of the heated air, the temperature sensor being placed upstream the steam heater, and
   a steam flow regulating valve for regulating the flow of the based on the measurement of the temperature by the temperature sensor.

12. The arrangement according to claim 11, wherein the plume control system comprises a first steam trap which is installed between the steam inlet and the steam flow regulating valve.

13. The arrangement according to claim 3, wherein the plume control system comprises a second steam trap placed after the steam heater.

14. The arrangement according to claim 3, wherein the plume control system comprises a vacuum safety valve and an air vent situated between the steam flow regulating valve and the steam heater.

15. The arrangement according to claim 3, wherein the plume control system comprises a ball valve in the vicinity of the steam inlet, which is closed during normal operation and which is arranged to be opened during start up or on demand.

16. The arrangement according to claim 3, wherein the plume control system comprises a temperature sensor to measure the temperature of the heated air, the temperature sensor being placed downstream the electric heater, wherein the electric heater comprises a plurality of heating rods.

* * * * *